United States Patent [19]
Donovan et al.

[11] Patent Number: 4,735,809
[45] Date of Patent: Apr. 5, 1988

[54] ANIMAL FEED BLOCKS CONTAINING DIETARY SUPPLEMENTS

[75] Inventors: Dennis Donovan; Gerald C. Weigel, Decatur, both of Ill.

[73] Assignee: Archer Daniels Midland Company, Decatur, Ill.

[21] Appl. No.: 769,598

[22] Filed: Aug. 26, 1985

[51] Int. Cl.$^4$ .............................................. A23K 1/22
[52] U.S. Cl. .......................................... 426/69; 426/72; 426/74; 426/623; 426/630; 426/658; 426/807
[58] Field of Search ...................... 426/72, 74, 69, 623, 426/630, 635, 658, 807

[56] References Cited

U.S. PATENT DOCUMENTS

| | | | |
|---|---|---|---|
| 3,246,336 | 4/1966 | Baribo et al. | 426/807 X |
| 4,016,296 | 4/1977 | De Santis | 426/807 X |
| 4,027,043 | 5/1977 | Schroeder | 426/74 |
| 4,171,385 | 10/1979 | Skoch et al. | 426/69 |
| 4,221,818 | 9/1980 | Schroeder | 426/635 |
| 4,234,608 | 11/1980 | Linehan | 426/72 |
| 4,265,916 | 5/1981 | Skoch et al. | 426/635 X |
| 4,349,578 | 9/1982 | Wright et al. | 426/807 X |

OTHER PUBLICATIONS

Whistler et al., Starch Chemistry & Technology" Academic Press (1967) pp. 30-33.

Primary Examiner—R. B. Penland
Attorney, Agent, or Firm—Laff, Whitesel, Conte & Saret

[57] ABSTRACT

A low cost process is used to make animal feed blocks from by-product residues of the corn and cotton industries. The first and liquid materials to be placed in a mixer include condensed fermented corn extractives, molasses, and hot water (all at approximately 110° F.). The mixer is started, and a suspending agent, such as clay, is added to keep both the above and the later added ingredients in suspension. The clay should preferably be added before fat and any dry ingredients are added. Next, animal fat, vitamins, and other ingredients are added with the mixer running. Cottonseed meal is used as a rehydrating material to take up free water and thereby reduces the amount of water available to react with nitrogen, and in turn, reducing the amount of liberated ammonia. The pH is carefully controlled to be highly alkaline, for causing consumption limiting by the animal ingesting the feed block. After the ingredients are added, the mixture is brought to a temperature which is preferably approximately 140° F. Then, all of the ingredients are mixed for approximately two minutes, after which the mixture is placed in corrugated cardboard boxes, to remain in inventory until the resulting feed blocks reach a suitable hardness.

10 Claims, No Drawings

ANIMAL FEED BLOCKS CONTAINING DIETARY SUPPLEMENTS

This invention relates to animal feed blocks and, more particularly, to molasses based feed blocks containing dietary supplements along with certain hardening or blocking agents.

A related invention is described in U.S. patent application Ser. No. 06/626,489, filed July 5, 1984. Some of the ingredients used in that and other feed blocks have also been described in the following U.S. patents on various animal feed blocks: U.S. Pat. Nos. 3,420,672; 4,005,192; 4,016,296; 4,027,043; 4,062,988; 4,160,041; 4,061,728; 4,171,379; 4,171,385 (now Re. 31,763); 4,171,386; 4,221,818; 4,234,608; 4,265,916.

There are a number of solid, weather resistant blocks that provide feed supplements which animals may ingest on a self-demand basis, in order to acquire necessary nutrients. A first consideration and primary purpose for making such blocks is to provide those vitamins, minerals, and similar food nutrients which a particular species of animal might require. These nutrients should be presented to the animal in a form which does not spoil or erode when exposed to weather or other environmental conditions.

Once these primary purposes are accomplished, other considerations enter into the making of the feed blocks. For example, it is always desirable to improve the ability of the feed block to better withstand more hostile environmental conditions. The blocks should be adaptable to be molded into a great variety of size and shape control. A consumption limiter should be included to control the rate at which the animal ingests the block, which should generally correspond to the rate at which the animal should acquire the necessary nutrients.

A correctly constructed feed block should include essential ingredients that are weighed and mixed in a proper proportion and sequence. Otherwise, the feed block might have two negative and, perhaps, serious drawbacks relative to the consuming animal specie, these drawbacks resulting from ammonia liberation and excessive consumption by the animal. Ammonia is an irritant to both humans and animals if consumed in excessive amounts. Ammonia results from chemical reactions that take place in the process of making feed blocks if non-protein-nitrogen ingredients, such as ammonium polyphosphate or urea are used in combination with water. Ammonium polyphosphate is much more reactive than is urea. Consequently, a feed block should exclude ammonium polyphosphate, since doing so reduces an excess liberation of ammonia.

Also, certain ingredients or formulations used in chemical feed blocks increase the liberation of ammonia. For example, non-bound or free water reacting with the non-protein-nitrogen sources used in the chemical block formulations leads to such a liberation of ammonia. Thus, it is desirable for a feed block to include a rehydrate material which takes up free water.

From a livestock management point of view, it may be desirable to control consumption of the feed blocks. This may be necessary because certain ingredients would be detrimental to livestock health if over-consumed. Urea is an example of this type of ingredient. Consumption limiters which are used in the prior art are exemplified by salt, fat, and magnesium oxide. The inventive feed block does not contain an ingredient which is added solely as a consumption limiter, per se. Instead, consumption limiting results from the nature of the inventive block and from the pH that is maintained is highly alkaline, with a pH of 9.65 preferred.

Appetite is generally affected by factors that interfere with the normal functions of the gastro-intestinal tract. The inventive feed block has a highly alkaline pH. This alkaline product increases rumen pH, indicating that the higher pH rumen liquor has a greater buffering capacity, consequently controlling intake, (*Digestive Physiology and Nutrition of Ruminants*, Second Edition, D. C. Church). The inventive block has two distinct pH regulators, calcium and urea. The fat products in the inventive block also contribute to the alkaline pH as well as help control intake of the inventive block. Fat products in the diet of forage consuming cattle reduces the rate of food passage out of the stomach and into the duodenum triggering hormonal mechanisms that causes restrictions of the pylorus resulting in a slower emptying of the stomach, (*Basic Animal Nutrition and Feeding*, First Edition, D. C. church and W.G. Pond).

It is also well understood in livestock or poultry nutrition that animals tend to consume feed to meet their energy requirements. This is called caloric density. Animals naturally eat less of a higher energy product than a lower energy product. This inventive block is a high energy product due to the fat product inclusion.

Without the ingredients set forth in a prescribed formula and mixed in the prescribed sequence, the desired basic pH would not likely be achieved, thereby resulting in overeating by the consuming animal specie. Over-consumption might cause a toxic reaction due to the consumption of an excessive amount of ammonia.

Accordingly, an object of the invention is to provide new and improved animal feed blocks. Here, an object is to provide feed blocks having improved resistance to the liberation of ammonia. Yet another object is to provide feed blocks that provide the animal the desired nutrients based on limited consumption. Still another object of the invention is to provide a formula which is adaptable to the manufacture of feed blocks in almost any size and shape.

A further object of the invention is to use ingredients that substantially reduces the amount of ammonia that is liberated and, therefore, reduces the potential toxicity of the feed block.

A still further object of the invention is to provide a feed block utilizing essential ingredients that maintain a consumption limiting alkaline pH in the block for supplying supplemental nutrients to an animal while maintaining its consumption within a range of 2.0 to 4.0 pounds, per day.

Another object of the invention is to substantially reduce the cost of manufacturing animal feed blocks by using mostly liquid ingredients which can be pumped into a mixer.

In keeping with an aspect of the invention, these and other objects are accomplished by a relatively low cost process based on the use of by-product residues of the corn and cotton industries. The first and liquid materials to be placed in a mixer include condensed fermented corn extractives, molasses, and hot water (approximately 110° F). The mixer is started, and a suspending agent such as clay is added to keep both the above-mentioned and the later added ingredients in suspension. The clay should preferably be added before fat and any dry ingredients are added. Next, fat products, vitamins, and other ingredients are added to the mixer. Magnesium oxide and cotton seed meal are added with the mixer running. The cottonseed meal is a rehydrating material which takes up free water and thereby reduces the amount of water available to react with nitrogen, and in turn, reducing the amount of liberated ammonia. The pH is carefully controlled to be highly alkaline, for consumption limiting. After these ingredients are added, the mixture is brought to a temperature which is preferably about 140° F. Then, all of the ingredients are mixed for approximately two minutes, after which the mixture is placed in corrugated cardboard boxes, to remain in inventory until the resulting feed blocks reach a suitable hardness.

Condensed fermented corn extractives (also known as corn steep liquor) is a liquid residue of the corn refining industry.

Corn steep liquor is not only a good source of energy relative to the use in ruminant rations, but also relative to the use of several other key nutrients. Throughout the world, several studies have been conducted for the utilization of corn steep liquor. Data collected by Salah Fode, et al., National Research Center, Dokii Giza, Egypt, demonstrates that corn steep liquor is a proven source of inositol as well as several key B-Vitamins. The same literature suggests that an excellent rumen microbial media occurs when corn steep liquor is in the diet. Corn steep liquor is suggested by this literature as an excellent ingredient to promote the growth of a media for micro-organisms especially in fermentation.

Work conducted by Lusby, et al, at Oklahoma State University, Stillwater, Okla., suggests that corn steep liquor can be used as a protein source for supplementing the food of range cattle. They demonstrated that corn steep liquor's protein content is high in amino acids, peptides and proteins of microbial origin. This work was supported by an Ohio study indicating that corn steep liquor significantly increased crude fiber, cellulose and dry matter digestibilities in ruminants, when added to a high fiber diet.

All this data demonstrates that corn steep liquor is not added just as an energy source, as molasses is added, but also contributes significantly to the following key nutrient requirements and relationships:

Protein Nutrition
B-Vitamin Nutrition
Mineral Nutrition
Improved Total Dry Matter Utilization
Improved Fiber Digestion To produce such extractives, corn is cleaned and soaked or steeped in a battery of tanks (steeps) together with warm water containing approximately 0.1 to 0.2 percent sulfur dioxide. The steepwater swells and softens the grain to facilitate a separation of the various components and is ultimately drawn off and replaced by fresh water. The steeped corn is degerminated in a water slurry by first passing it through a shearing mill which releases the germ and then passing it to a continuous liquid cyclone type separator which separates the germ for oil extraction. The separated endosperm and hull are then ground and screened. The resulting slurry is passed into a continuous centrifuge for starch and gluten separation.

More information about corn processing which produces corn steep liquor is available from the Corn Refiners Association, Inc., at 1001 Connecticut Avenue, N.W., Washington, D.C. 20036, in publications entitled "Tapping the Treasure in Corn", "Nutritive Sweetness from Corn", "Corn Starch", and perhaps, also in other publications.

The use of condensed fermented corn extractives in combination with certain other ingredients provides the hardening or blocking agents in the feed block. Condensed fermented corn extractives are obtained by the partial removal of water from the liquid that results from steeping corn in a water and sulphur dioxide solution that is allowed to ferment by the action of naturally occurring lactic acid-producing micro-organisms. This invention requires condensed fermented corn extractives, at approximately 20% by weight.

The invention makes use of a preservative sold by Monsanto under the trademark"AFLABAN DF". Monsanto describes this preservative in the following manner:

PRODUCT SPECIFICATIONS

Formulations—"AFLABAN DF"—100% Sarbic Acid. A dry, micronized, dedusted powder. (99-101% on assay.) The formulation meets NF (National Formulary) and Food Chemical Codes specifications.
Appearance—Free-flowing, white powder.
Odor—Mild and characteristic.
Particle Size—Less than 15% retained on 100 mesh screen.
Bulk Density—41 lbs./cu. ft.
FDA Status—Formulation has a GRAS status (Generally Recognized as Safe) for use as feed additives. No withdrawal time is required prior to slaughter.
Packaging—Packaged in 100 lb. fiber drums.
Handling Precautions—None. Formula is safe to handle, non-corrosive, and has no noxious odors (a common problem with other preservatives, such as propionic acid).
NOTE: AFLABAN DF has been dedusted for ease of handling. It may be added directly to the feed mixer, to premixes, to feed by-products, or to stored grains.

THE PROBLEM

Mold, yeast and bacterial microorgaisms live virtually everywhere in nature. Molds in feeds produce heating, dustiness, unpalatablility, with caking and obnoxious odors in more advanced stages. Often, molds and yeasts are present and reducing feed quality even though not apparent to the casual observer. However, a simple carbon dioxide ($CO_2$) measurement of the feed will confirm their presence since they produce $CO_2$. Research has shown that certain microbial species produce toxic poisons (mycotoxins) in feeds—including aflatoxins—that are an economic threat to profitable animal production.

| Example of Microbiological Problems | |
|---|---|
| Molds | Mycotoxicosis |
| Yeasts | Crop Mycosis |
| Bacteria | Enteritis |

Mycotoxins can also remain in the feed long after the mold that produced them has died.
Mycotoxins can result in such problems as . . .
Reduced growth,
Reduced feed efficiency,
Reduce nutrient utilization,
Increase bruise susceptibility,
Liver damage, such as cirrhosis,
Nervous systems,
Kidney damage.

The other hardening agent used for the invention to complete its chemical reaction is magnesium oxide. The requirement for magnesium oxide is approximately 4-5% by weight.

The molasses may be cane molasses, beet molasses, starch molasses, citrus molasses, or hemicellulose extract, preferably with a 79.5 Brix, which is an approximate percentage by weight of solids in the molasses solution. Cane molasses is a by-product of the manufacture or refining of sucrose from sugar cane. Beet molasses is a by-product of the manufacture of sucrose from sugar beets. Both of these molasses preferably have a Brix of not less than 79.5. Starch molasses is a by-product of the manufacture of dextrose from starch derived from corn or grain sorghums in which the starch is hydrolized by use of enzymes or acid. The starch molasses should not contain less than 73% total solids. Citrus molasses is the partially dehydrated juices obtained from the manufacture of dried citrus pulp. It preferably has a Brix of approximately 71.0. Hemicellulose extract is a by-product of the manufacture of pressed wood. It is the concentrated soluble material obtained from the treatment of wood at an elevated temperature and pressure without use of acids, alkalis, or salts. It preferably has a total carbohydrate content of not less than 55%.

Molasses should not be heated above approximately 110° F. for any substantial length of time, because excessively high temperatures can damage it by causing charring or carmelization. When hot water heating is not available, saturated steam at no more than 15 psi may be used to heat the molasses which should be agitated vigorously to avoid local overheating.

Urea is utilized by the ruminant animal to form protein. In greater detail, urea is a non-protein nitrogen which is currently being produced commercially with a 45.04% nitrogen level or 281.5% crude protein equivalent (45.04% × 6.25). The urea is converted to ammonia and other by-products in the rumen, where microbes incorporate the ammonia and related by-products into cellular protein. Since urea contains no energy, it must be provided by other ingredients.

Macrominerals are minerals which are provided in larger amounts and "trace" minerals are provided in very minute amounts. For example, calcium carbonate and salt are examples of macrominerals, whereas zinc and calcium iodate are trace minerals used in the inventive block. The trace minerals and vitamins are normally measured in milligrams, micrograms or parts per million.

This invention uses critical plant protein products that reduce the liberation of ammonia by rehydration or taking up free water. More particularly, cottonseed meal is used by this invention for such rehydration, thereby reducing the amount of free water which is available to react with nitrogen and thus reducing ammonia liberation. Cottonseed meal or an equivalent rehydrating material should be in the range of approximately 10-20%, and preferably approximately 16%, by weight.

The formula for providing a feed block with the above-described considerations is:

| Ingredients | Preferred Percentage | Range of Useful Percentage |
|---|---|---|
| Condensed fermented corn extractives | 20.00 | 15-35 |
| Molasses | 19.774 | 15-60 |
| Water | 15.067 | 0-20 |
| Attapulgite clay (predispersed liquid) | 6.00 | 2-6 |
| Urea 281.5 | 3.72 | 0-10 |
| Fat products | 3.30 | 0-10 |
| Calcium carbonate | 6.01 | 0-10 |
| Sodium Tripolyphosphate | 2.20 | 0-10 |
| Salt | 2.995 | 0-10 |
| Trace minerals | 0.140 | 0-5 |
| Vitamins | 0.018 | 0-5 |
| Magnesium oxide | 4.751 | 4-6 |
| Cottonseed meal | 16.00 | 15-20 |
| Aflaban DF | .025 | 0-1 |
| | 100.0 | |

The first ingredients added to the mixer are condensed fermented corn extractives, molasses, and water. The condensed fermented corn extractives aid in the hardening process upon the completion of the mixing. A suspending agent, attapulgite clay, is added in order to keep all ingredients in suspension and mixed over a time period which is sufficient time to develop a homogenous mix. The other dry and liquid ingredients, including magnesium oxide, are then added to aid in the hardening process. This material is then pumped into containers and will begin to harden.

In greater detail, the following process steps will produce the inventive feed block. The procedure for mixing the various ingredients is accomplished in the following manner:

Step 1—Weigh and add the pre-heated (110° F.) condensed fermented corn extractives into the mixer.

Step 2—Weigh and add the pre-heated (110° F.) molasses into the mixer.

Step 3—Weigh and add the pre-heated (110° F.) water into the mixer.

Step 4—Weigh and add the attapulgite clay into the mixer.

MIX FOR APPROXIMATELY THREE MINUTES

It is important for the attapulgite clay to be introduced in step 4 so that the other ingredients added after step 4 will remain in suspension.

Step 5—Weigh and add the urea into the mixer.

Step 6—Weigh and add the fat products into the mixer.

Step 7—Weigh and add the calcium carbonate and salt into the mixer.

The sequence of steps 5-7 should preferably be followed carefully.

Step 8—Weigh and add the water soluble trace minerals into the mixer.

Step 9—Weigh and add the liquid vitamins A, D, and E into the mixer.

Step 10—Weigh and add the magnesium oxide into the mixer.

MIX FOR APPROXIMATELY ONE MINUTE

Step 11—Weigh and add the cottonseed meal into the mixer.

MIX FOR APPROXIMATELY TWO MINUTES OR

UNTIL THE MIX TEMPERATURE REACHES APPROXIMATELY 140° F.

It is important for the magnesium oxide to be added in the next to last step.

The mixture is now ready to be pumped into suitable containers for hardening.

A feed block is not normally considered to be a "solid" until it withstands six pounds per square inch pressure. To measure this, an Effegi Model No. FT 011 fruit pressure tester is used with a 5/16" plunger. This tester is available from McCormick Fruit Tree Co., of Yakima, Wash. In any event, the filled corrugated cardboard boxes remain in inventory until the blocks withstand approximately four to six pounds per square inch pressure. The boxes are preferably not moved for at least four hours, and the final block product preferably is not transported for sale until the block withstands a six pound per square inch pressure.

Those who are skilled in the art will readily perceive how to modify the invention. Therefore, the appended claims are to be construed to cover all equivalent structures which fall within the true scope and spirit of the invention.

The claimed invention is:

1. A process for making a highly alkaline feed block wherein the ingredients consists of:

| Ingredients | Percentage |
|---|---|
| Condensed fermented corn extractives | 20.00 |
| Molasses | 19.774 |
| Water | 15.067 |
| Attapulgite clay (predispersed liquid) | 6.00 |
| Urea | 3.72 |
| Fat Products | 3.30 |
| Calcium carbonate | 6.01 |
| Sodium Tripolyphosphate | 2.20 |
| Salt | 2.995 |
| Trace Minerals | 0.140 |
| Vitamins | 0.018 |
| Magnesium oxide | 4.751 |
| Cottonseed meal | 16.00 |
| Aflaban DF | .025 | and the process steps consist of:

Step 1—Weigh and add the condensed fermented corn extractives into a mixer

Step 2—Weigh and add molasses into said mixer;

Step 3—Weigh and add water into said mixer;

Step 4—Weigh and add attapulgite clay into said mixer and mix for approximately three minutes;

Step 5—Weigh and add into said mixer;

Step 6—Weigh and add fat prducts into said mixer;

Step 7—Weigh and add calcium carbonate and salt into said mixer;

Step 8—Weigh and add water soluble trace minerals into said mixer

Step 9—Weigh and add liquid vitamins into said mixer;

Step 10—Weigh and add magnesium oxide into said mixer;

Step 11—Weigh and add cottonseed meal into said mixer;

Step 12—Control the pH to make the feed block highly alkaline; mix for a predetermined period of time or until the mix reaches a predetermined temperature; and Step 13—Transfer the mixture from said mixer into containers to harden.

2. The feed block of claim 1 wherein each of the ingredients added in steps 1-3 is preheated to a temperature of approximately 110° F. before being added into the mixer.

3. The feed block of claim 1 wherein the mixing period in step 12 is approximately two minutes, or until the temperature of the mix reaches a temperature of approximately 140° F.

4. A process for making a highly alkaline feed block wherein the ingredients consist of:

| Ingredients | Percentage |
|---|---|
| Condensed fermented corn extractives | 15-35 |
| Molasses | 15-60 |
| Water | 0-20 |
| Attapulgite clay (predispersed liquid) | 2-6 |
| Urea | 0-10 |
| Fat Products | 0-10 |
| Calcium carbonate | 0-10 |
| Sodium Tripolyphosphate | 0-10 |
| Salt | 0-10 |
| Trace Minerals | 0-5 |
| Vitamins | 0-5 |
| Magnesium oxide | 4-6 |
| Cottonseed meal | 15-20 |
| Aflaban DF | 0-1 | and the process steps consist of:

Step 1—Weigh and add the condensed fermented corn extractives into a mixer

Step 2—Weigh and add molasses into said mixer;

Step 3—Weigh and add water into said mixer;

Step 4—Weigh and add attapulgite clay into said mixer; mix for a predetermined period of time;

Step 5—Weigh and add urea into said mixer;

Step 6—Weigh and add fat products into said mixer;

Step 7—Weigh and add calcium carbonate and salt into said mixer;

Step 8—Weigh and add water soluble trace minerals into said mixer

Step 9—Weigh and add liquid vitamins into said mixer;

Step 10—Weigh and add magnesium oxide into said mixer; mix for a predetermined period of time;

Step 11—Weigh and add cottonseed meal into said mixer;

Step 12—Control the pH to make the feed block highly alkaline; mix for a predetermined period of time or until the mix reaches a predetermined temperature; and Step 13—Transfer the mixture from said mixer into containers to harden.

5. The process of claim 4 wherein each of the ingredients added in steps 1-3 is preheated to a temperature of approximately 100° F. before being added into the mixer.

6. The process of claim 4 wherein the mixing period of time between steps 4 and 5 is approximately three minutes.

7. The process of claim 4 wherein the mixing period in step 12 is approximately two minutes, or until the temperature of the mix reaches a temperature of approximately 140° F.

8. A solid highly alkaline animal feed block consisting of 15-60% by weight molasses; 15-35% by weight condensed fermented corn extracts; 0-20% by weight water; 2-6% by weight attapulgite clay; 0-10% by weight fat; 0-10% by weight urea; 4-6% by weight magnesium oxide; 15-20% by weight cottonseed meal; 0-10% by weight calcium carbonate; 0-10% by weight salt; 0-10% by weight sodium tripolyphosphate; and 0-11% by weight minerals, vitamins and a preservative.

9. A solid highly alkaline animal feed block produced from a liquid mixture consisting of 15-60% by weight molasses; 15–35% by weight condensed fermented corn extracts; 0–20% by weight water; 2–6% by weight attapulgite clay; 0–10% by weight fat; 0–10% by weight urea; 4–6% by weight magnesium oxide; 15–20% by weight cottonseed meal; 0–10% by weight calcium carbonate; 0–10% by weight salt; 0–10% by weight sodium tripolyphosphate; and 0–11% by weight minerals, vitamins and a preservative.

10. The highly alkaline animal feed block of claim 9 produced from a liquid mixture consisting of 19.77% by weight of molases; 20.0% by weight condensed fermented corn extracts; 15.067% by weight water; 6.0% by weight attapulgite clay; 3.30% by weight fat; 3.72% by weight urea; 4.751% by weight magnesium oxide; 16.0% by weight cottonseed meal; 6.0% by weight calcium carbonate; 2.995% by weight salt; 2.2% by weight sodium tripolyphosphate; and 0.183% by weight minerals, vitamins and preservative.

* * * * *